Oct. 10, 1967    KATASHI AOKI    3,345,691
INJECTION MOLDING MACHINE
Filed Dec. 2, 1964    2 Sheets-Sheet 1
Fig. 1.
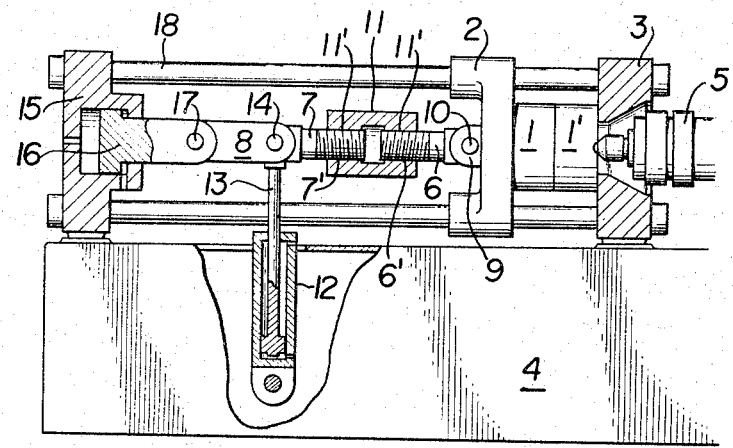
Fig. 2.
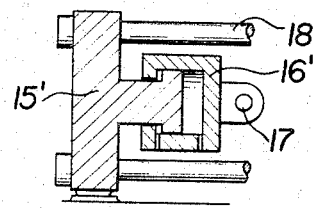
Fig. 3.

Oct. 10, 1967  KATASHI AOKI  3,345,691

INJECTION MOLDING MACHINE

Filed Dec. 2, 1964  2 Sheets-Sheet 2

United States Patent Office 3,345,691
Patented Oct. 10, 1967

3,345,691
INJECTION MOLDING MACHINE
Katashi Aoki, No. 6037 Oaza Nanjyo, Nagano-ken, Sakaki-machi, Hanishina-gun, Japan
Filed Dec. 2, 1964, Ser. No. 415,321
4 Claims. (Cl. 18—30)

ABSTRACT OF THE DISCLOSURE

A mold clamping apparatus with two-stage press and release strokes having a toggle linkage extended co-linearly and broken to a knuckle joint by a first hydraulic unit, a second hydraulic unit operatively connected to one end of the toggle linkage and adapted to reciprocate the linkage when extended co-linearly to move the toggle linkage as a unit, a mold press platen attached at the other end of the toggle linkage movable toward and away from a mold injection platen mounted on a support bed.

---

This invention relates generally to an injection molding machine and has particular reference to a novel mold clamping device to be used therein which provides easy adjustment of the mold thicknesses with minimum clamping force.

Clamping devices of this character prior to this invention were mechanically complicated and hence had great difficulty in making proper adjustment of the molds of varying thicknesses. Furthermore, the power required to operate such clamping device was large necessitating the use of a corresponding large hydraulic mechanism. Persistent use of such conventional clamping devices in an injection molding press will discourage any attempt to reduce equipment and maintenance cost.

The primary objective of this invention is the provision of a novel, useful clamping means in an injection molding machine which will eliminate the above noted difficulties of the conventional devices.

A preferred embodiment of the invention is characterized by the cooperation of a toggle joint mechanism and a hydraulic mechanism in causing the opening and closing action of the mold. In this arrangement, toggle action to provide the greater proportion of mold movement is caused by a relatively small bore hydraulic piston, while the finishing impingement of the mold against a blank is caused by a relatively large bore, i.e. small stroke hydraulic piston after the toggle joint has stretched straight out.

Another preferred embodiment of the invention is substantially the same as the first embodiment but has been so contrived as to provide a better and accurate operation of the mold clamping device.

The above object together with other objects and features of the invention which will become subsequently apparent reside in the details of construction and operation as more fully hereinafter described and claimed, reference being had to the accompanying drawings forming a part hereof, wherein like numerals refer to like parts throughout and in which:

FIG. 1 is a side view of a mold clamping device embodying the invention shown as in closed position, with portions cut away;

FIG. 2 is a side view of the same shown as in open position, with portions cut away;

FIG. 3 is a longitudinal cross-sectional view of a modified hydraulic piston arrangement for clamping connected to a toggle joint;

Figure 4:
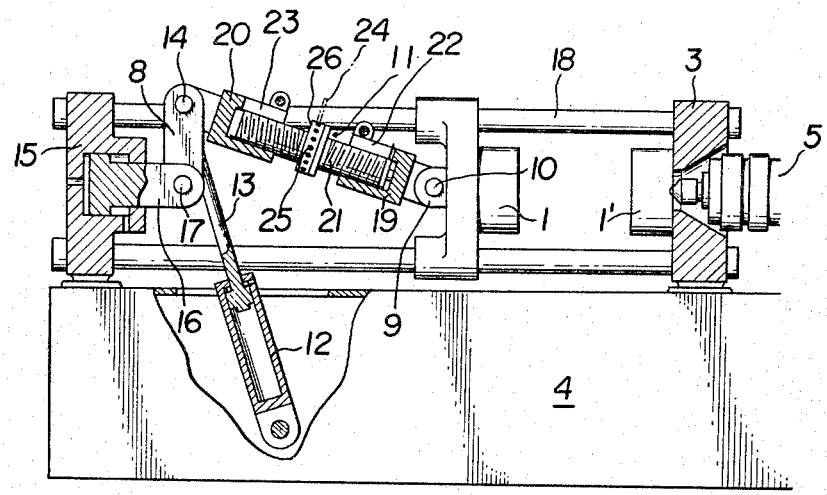
FIG. 4 is a partially cut away side view of another clamping device having a modified mold thickness adjusting member and shown as in open position.

The reference numerals 1 and 1' designate metal patterns. Designated as 2 is a mold press platen, 3 is a mold pressure receptacle, 4 is a bed and 5 is an injection unit, respectively. The mold press platen 2 is connected with the metal pattern 1 as shown in FIGS. 1 and 2. The mold pressure receptacle or platen 3 is connected with the metal pattern 1' and secured to the bed 4, and has mounted therein the injection unit 5. The toggle mechanism consists of a plurality of interlocking levers 6, 7 and 8. The interlocking lever 6 has one end thereof connected by pin 10 to a coupling member 9 and the other end connected across a mold thickness adjusting device 11 to the lever member 7. The mold thickness adjusting member 11 is a hollow cylindrical unit having threaded parts 11' in its inner periphery so that it is in threaded engagement with the interlocking levers 6 and 7 which are like-wise threaded at 6' and 7', respectively. The mold thickness adjusting device 11, being formed in the fashion of a turn buckle, may be rotated so as to regulate the distance between the two interlocking levers.

The interlocking lever or rod member 7 has the other end thereof connected pivotally by pin 14 to an hydraulic piston rod 13 of a toggle actuating hydraulic device 12 journalled within the bed 4 and to one end of the interlocking lever 8. The other end of the lever 8 is connected by pin 17 to a mold clamping hydraulic piston rod 16 which is slidably mounted in a hydraulic mechanism 15.

Designated at 18 is a tie rod along which the mold press platen 2 slides together with the metal pattern 1 and which is adapted to connect the mold platen 3 on the bed 4 to the clamping hydraulic mechanism 15. The clamping hydraulic device 15' is shown in FIG. 3 as being provided with a hydraulic cylinder 16', this arrangement being intended to substitute for the hydraulic piston rod 16 of FIGS. 1 and 2.

In the mold clamping device just described, it will be noted that separate from the hydraulic unit 12 adapted to actuate the toggle mechanism, another hydraulic mechanism 15 or 15' is provided which is adapted to give a final impinging force to the mold and which is connected to the terminal end portion of the toggle mechanism, and the mold thickness adjusting device 11 is adapted to permit the extension of the interlocking lever associated therewith.

With a mold clamping device of the type having a toggle mechanism alone, it requires extreme accuracy in adjusting the mold position with different thicknesses of the metal patterns used, in order to assure clamping with maximum pressure. This has hitherto necessitated fine adjustment and high skill in the operation.

Whereas it will be appreciated that since the lever 8 is connected at its terminal end to the piston rod 16 of the hydraulic mechanism 15 or to the cylinder 16' of the hydraulic unit 15', mold adjustment may be easily made within the range of strokes of the piston rod 16 or cylinder 16'. Taking a 150-ton mold clamping device as an example, adjustment of the molds may be done within plus or minus 5 mm. accuracy according to the invention. Such high tolerance permits the necessary adjustment of mold thicknesses with utmost ease and efficiency.

It will be also appreciated that a clamping device consisting of a toggle unit alone is subjected to increased friction at the lever-to-pin connections where high pressure is applied during the clamping operation. This difficulty is eliminated by the device of the invention in which the piston rod 16 of the hydraulic mechanism 15 or cylinder 16' of the hydraulic unit 15' connected to the terminal end of the toggle unit is caused to make a thrust only after the toggle levers and couplings have all been aligned, and the piston rod 13 of the hydraulic unit 12 actuates the toggle unit after the hydraulic unit 15 or 15' has attenuated its clamping force, so that the mold opens as the mold press platen 2 is retracted together with the metal pattern 1. In this operation, there is little or no mechanical wear of the lever-to-pin joints during interlocking motion thereof, which wear normally takes place in the absence of the high-pressure stroke of the clamping piston.

Advantageously, the size and capacity of the hydraulic system required for mold clamping may beconsiderably reduced by the fact that the toggle unit contributes to initial clamping as it stretches out and therefore, the piston rod 16 or cylinder 16' has only to finish the last, short stroke to give sufficient impingement upon the blank.

Figure 6:
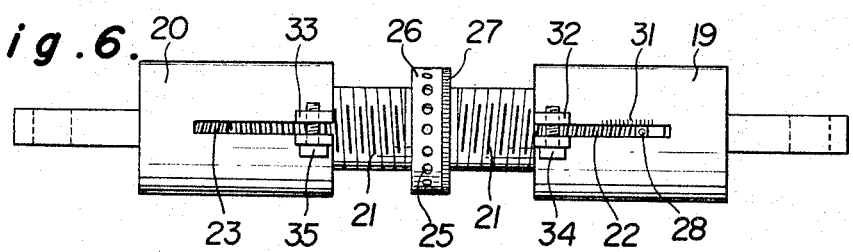
FIG. 6 is a plan view of FIG. 5.

Reference to FIGS. 4 and 6 shows a modified arrangement of the mold thickness adjusting device 11. In this example, the toggle unit consists chiefly of interlocking link members 19, 20 and a threaded adjusting lever 21 and is built in the form of a turnbuckle. The interlocking members 19 and 20 are provided therein with grooves 22 and 23, respectively, and are in threaded engagement with the adjusting lever 21. The interlocking link member 19 is connected at one end thereof by pin 10 to a coupling member 9 or projection extending from the rear portion of the mold press platen 2 and is threaded at the other end with an end of the adjusting lever 21. The opposite end of this lever is similarly threaded with the interlocking link member 20. The adjusting lever 21 has centrally mounted thereon an adjusting ring 26 having a suitable number of holes 25 adapted to insert a pin 24. The adjusting ring 26 is provided at its peripheral margin with a scale 27 whereby its position is read with respect to the cut-in grooves 22, 23.

Figure 5:
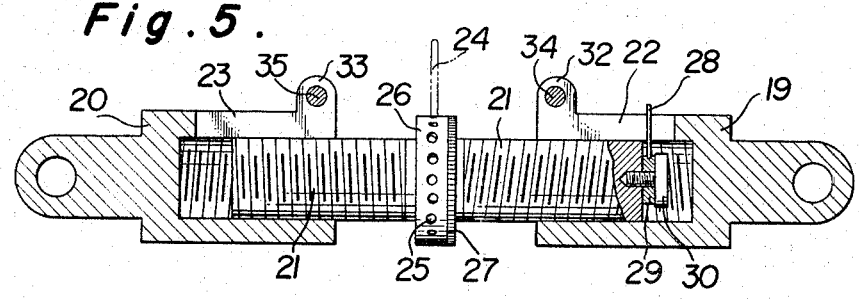
FIG. 5 is a longitudinal cross-sectional view of the modified mold thickness adjusting member of FIG. 4.

There is pivotally mounted a ring member 29 with pointer 28 in the end portion of the adjusting lever 21 opposite the adjusting ring 26, as shown in FIG. 5. A stop pin 30 is adapted for this purpose to connect the ring 29 to the adjusting lever 21. The pointer 28 attached to the ring member 29 extends from the groove 22 to the surface of the interlocking member 19 and reads on the scale 31 provided thereon.

The operating pin 24 may be inserted into any of the holes 25 of the adjusting ring 26 to turn this ring so that the distance between the two interlocking members 19 and 20 may be adjusted. The extent to which the adjustment is made may be readily read on the scales 27 and 31.

Further illustration of this embodiment of the invention as to similar parts already described will be omitted, except that bracket members 32 and 33 with screws 34 and 35 are provided respectively at the tip ends of the grooves 22 and 23 to hold the adjusting lever 21 in place, as this is illustrated in FIGS. 5 and 6.

Having described the construction of the mold clamping device according to the invention, it will be recognized as characteristic of the invention that there are provided two separate hydraulic units, one being adapted to supply ultimate impinging force to the mold while the other being adapted to actuate the toggle unit directly connected therewith at its terminal end. It is also to be noted that the interlocking members 19 and 20 forming a toggle mechanism are arranged in the fashion of a turnbuckle and are adjustable in the distance there-between by means of the adjusting lever 21. Furthermore, the whole unit is held securely in position with use of so that there is developed no mechanical loosing of the parts. The clamping unit once set for proper operation can maintain stable performance wih full toggle function as desired.

While there have been shown and described and pointed out the fundamental novel features of the invention as applied to a preferred embodiment, it will be understood that various omissions substitutions and changes in the form and details of the device illustrated, may be made by those skilled in the art, without departing from the scope and spirit of the invention defined in the following claims.

What is claimed is:

1. A mold clamping device for injection molding apparatus comprising a bed, a stationary injection mold platen supported on the bed, a mold press platen, a toggle unit including of a plurality of interlocking levers and connected at one end thereof to the press platen, a first hydraulic means journalled in said bed and connected to a terminal intermediate the ends of said toggle unit, said first hydraulic means extending said levers co-linearly and breaking said levers non-linearly to reciprocate said mold press platen toward and away from said injection mold platen, a second hydraulic means adapted to reciprocate said toggle unit only when the levers are in extended co-linear condition.

2. The device of claim 1 wherein said second hydraulic means is coupled to the terminal end of said toggle unit by one of said interlocking levers and a hydraulic piston rod attached to said hydraulic means actuated to reciprocate the extended levers.

3. The device of claim 2 wherein an hydraulic cylinder attached to said second hydraulic means is used in lieu of said hydraulic piston rod.

4. The device of claim 1 wherein said mold press platen and said first hydraulic means are connected by a turn buckle mechanism having incorporated therein an adjusting lever with a ring, said lever being adapted to adjust the total length of said interlocking levers in extended condition, and indicating means on said ring indicating said adjustment.

References Cited

UNITED STATES PATENTS

| 986,174 | 3/1911 | Jegge | 18—16 |
|---|---|---|---|
| 1,922,937 | 8/1933 | Eckert | 18—30 |
| 2,233,354 | 2/1941 | Thilenius | 18—30 |
| 2,356,634 | 8/1944 | Van Opel | 18—30 |
| 3,166,790 | 1/1965 | Keyes | 18—16 X |

WILLIAM J. STEPHENSON, *Primary Examiner.*